United States Patent [19]

Spruyt et al.

[11] 3,835,905
[45] Sept. 17, 1974

[54] CAMERA CASE FOR A POCKET CAMERA
[75] Inventors: Harry Spruyt, New York, N.Y.;
Louis S. Hoffman, Morristown, N.J.
[73] Assignee: Colorcraft Corporation, Durham, N.C.
[22] Filed: July 6, 1973
[21] Appl. No.: 376,939

[52] U.S. Cl. ............................................. 150/52 J
[51] Int. Cl. ........................................... A45c 11/38
[58] Field of Search ......................... 150/52 J, 52 R

[56] References Cited
UNITED STATES PATENTS
1,082,862   12/1913   Geschickter .............. 150/52 R UX
2,223,219   11/1940   Maycrovitz .................... 150/52 J X
3,314,464   4/1967    Veilleux ........................... 150/52 R Primary Examiner—Donald F. Norton
Attorney, Agent, or Firm—Kenyon & Kenyon Reilly Carr & Chapin

[57] ABSTRACT

A camera case for a pocket camera is formed of top and bottom vinyl covers with the top part of the cover sized so that it fits snugly on the end of the camera. The top and bottom are attached to each other with an elastic band which is heat sealed into each thereby permitting removal of the bottom portion when it is desired to use the camera.

10 Claims, 4 Drawing Figures

PATENTED SEP 17 1974 3,835,905

CAMERA CASE FOR A POCKET CAMERA

BACKGROUND OF THE INVENTION

This invention relates to cameras in general and more particularly to a case for a generally rectangular shaped pocket camera.

In recent years there has been a great deal of emphasis on small cameras which may be carried in the pocket. Such cameras make it easy for an amateur photographer to carry his camera wherever and whenever he desires without the need for special camera cases, camera bags, etc. Unfortunately, when such a camera is carried in the pocket, the optical surfaces such as the camera lens and viewfinder can become covered with lint and dirt thereby affecting the quality of the pictures taken unless the lenses are frequently cleaned. In addition, the lens may be scratched causing permanent damage. In view of this, it can be seen that there is the need for a case for such cameras which will provide them with protection from dirt, lint and so on. However, such a case must be so constructed so as to not detract from the main advantage of the small camera, i.e., its ability to be carried in the pocket. In addition, such a case should not materially affect the ease of operation. That is to say it should not be necessary for the amateur photographer to have to remove the camera from the case, put the case aside, and then remember to put the camera back in the case when he has finished his pictures. Thus, a case for such a camera should be of the type which can be opened in such a way as to remain attached to the camera during the taking of pictures. In addition, because most of these cameras are themselves inexpensive, a practical case must not be too expensive, otherwise the cost of the case could materially increase the overall cost to the amateur photographer.

SUMMARY OF THE INVENTION

The camera case of the present invention fills all the above noted needs. It provides a light weight vinyl case which gives the lenses of the camera adequate protection from dirt, dust, lint, moisture and the like when carried in the pocket; it is easy to use, i.e., it never has to be completely removed from the camera, and inexpensive to manufacture. The case is comprised of a small top section which is sized to fit snugly over the end of the camera away from the lense and view finder. Attached to the top portion with an elastic band is a bottom section which slides over the rest of the camera and has a telescope fit over a portion of the top. When the camera is to be used, it is only necessary for the photographer to pull the bottom portion away from the top portion and allow it to drop. During picture taking, the top portion remains attached with the bottom portion hanging loosely below the camera and out of the way. In addition, a tripod hole and slot strap along with a radius cut-out for flash cube rotation may be formed into the top portion of the case. In the preferred embodiment the case is made of a vinyl material so that both the top and bottom may each be manufactured from a single precut piece of vinyl which is heat sealed together in a well known manner with the elastic strap between the top and the bottom heat-sealed into each end.

DETAILED DESCRIPTION OF THE PREFERRED EMBODIMENT

Figure 1:
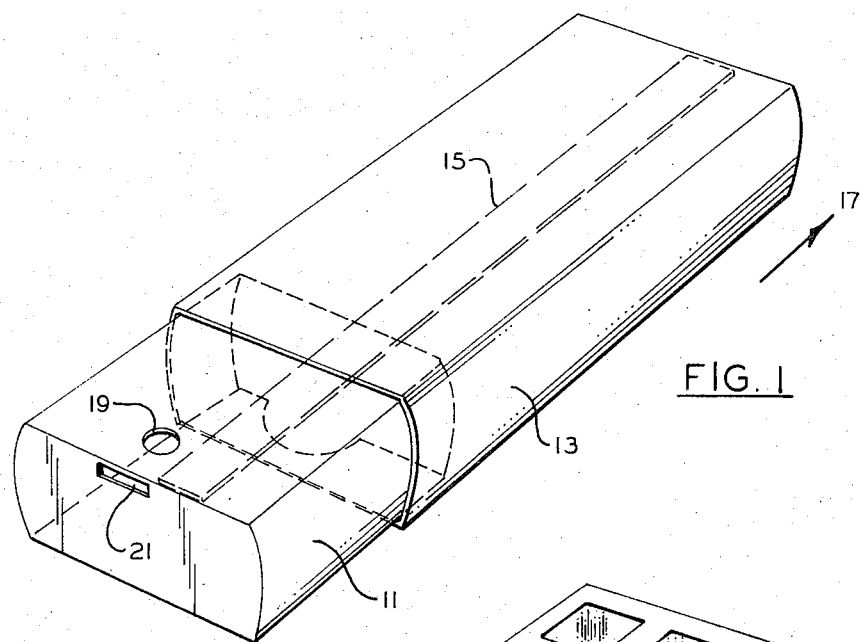
FIG. 1 is a perspective view of a preferred embodiment of the present invention.
Figure 2:
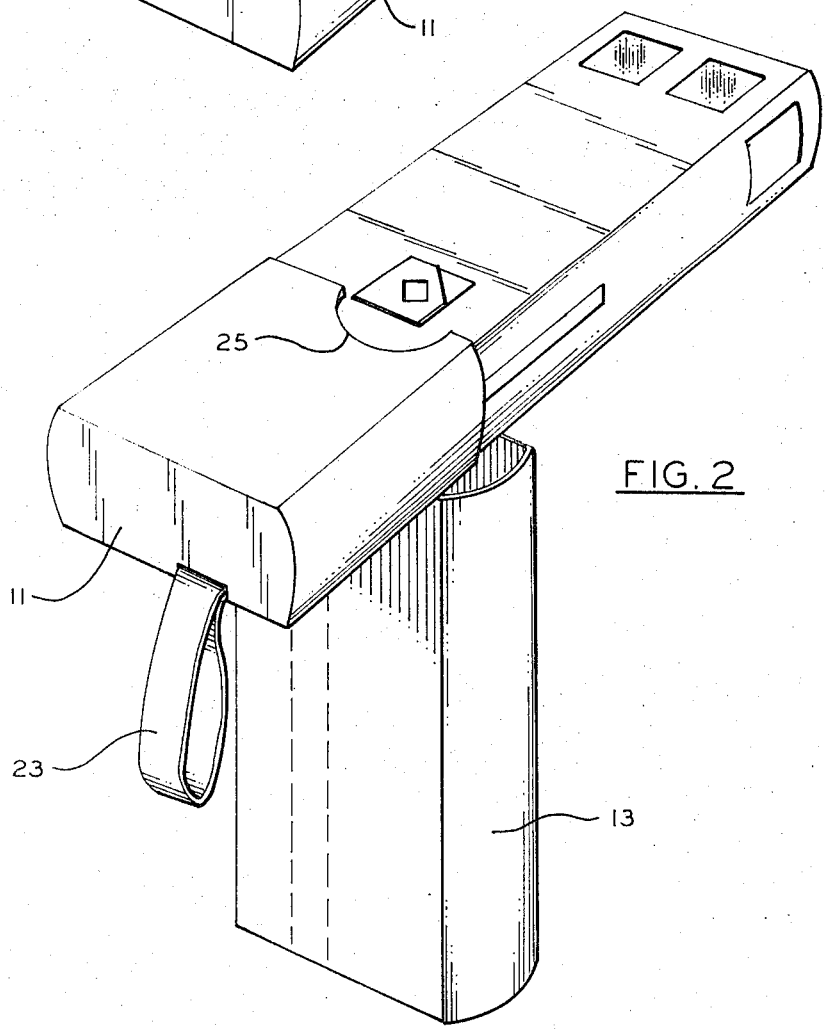
FIG. 2 is a perspective view of the camera case of the present invention showing the case attached to a pocket camera with the bottom portion removed for taking pictures.

As shown on FIG. 1, each of the top and bottom pieces of the camera case are made of an open rectangular shape. The top portion 11 is shorter and of a smaller size than the bottom portion 13. The top portion 11 is preferably sized so that it fits snugly on the end of the camera as shown in FIG. 2. The bottom portion is made of a cross sectional size so that it will telescope over the top portion in the manner illustrated on FIG. 1. The top 11 and bottom 13 are connected by an elastic band 15 which in the position shown holds the bottom 15 tightly against the camera and overlapping the top 11. The elastic 15 permits withdrawing the bottom in the direction of arrow 17 when it is desired to use the camera. After it is withdrawn over the end of the camera, the bottom 13 will hang below the camera as shown by FIG. 2 out of the way of the viewfinder and lens. The top 11 may include a hole 19 through which a tripod may be inserted and a hole 21 for a camera strap 23 to pass through as shown on FIG. 2. The top portion 11 will also contain a radius cutout 25 to permit flash cube rotation.

The top and bottom portions will preferably be made of a pliable and heat sealable material such as vinyl. Such a material has the advantage that it will, when properly sized, provide a snug stretch fit over the end of the camera. In addition, it provides a simple means of manufacturing the camera case.

Figure 3A:
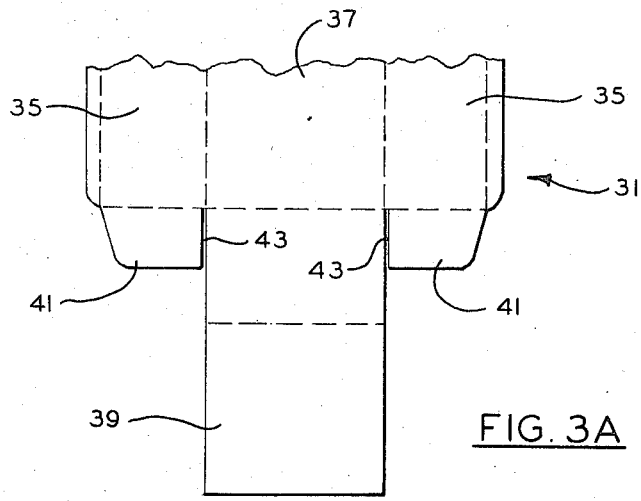
FIGS. 3A and 3B are plan views of the two pieces from which the top and bottom may be made.
Figure 3B:
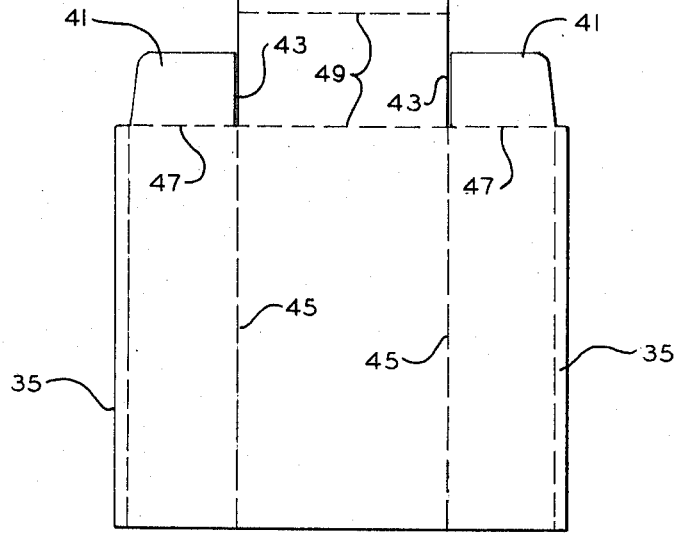

FIGS. 3A and B illustrate the manner in which each of the top and bottom may be made of a single piece of vinyl. The top 31 and the bottom 33 will each be cutout of a single piece as shown. Each will have two sides 35, a front 27, a back 39 and two tabs 41. To allow the tabs to be folded in, cuts will be made along the lines 43. To assemble the finished top and bottom sections, the sides 35 will be folded up along the dotted lines 45, the tabs folded in along the lines 47 and the back and front folded up along the lines 49. The back 39 will be sealed to each of the sides 35 along the portions shown by light lines on both the backs and the side. Note that each of the sides 35 has a small portion of overlap which will fold over when sealed onto the back 39. After completion of the assembly of the top 31 and the bottom 33 the elastic 17 shown on FIG. 1 is then heat-sealed into each of the two pieces.

Thus, a simple and inexpensive camera case for use with rectangular pocket cameras which protects them from dirt and so on which is found in the pocket has been shown. Although a specific embodiment has been illustrated and described, it will be obvious to those skilled in the art that various modifications may be made without departing from the spirit of the invention which is intended to be limited solely by the appended claims.

What is claimed is:

1. A camera case for a pocket sized camera which is of an essentially rectangular shape comprising:
   a. a hollow top portion of substantially rectangular cross section and open on one end and sized to fit over an end of the camera without interferring with the camera lens or viewfinder;
   b. a hollow bottom portion of substantially rectangular cross section open on one end and sized to cover the remainder of the camera with a portion overlapping said top; and
   c. an elastic member attached to the inside of said top portion and the inside of said bottom portion arranged to hold said top and bottom together but having sufficient stretch to permit removing said bottom while said top remains over said camera.

2. The invention according to claim 1 wherein said top portion is of a cross sectional size such as to fit snugly on said camera.

3. The invention according to claim 2 wherein said top and bottom portions are made of a pliable material.

4. The invention according to claim 3 wherein said pliable material is heat sealable.

5. The invention according to claim 4 wherein said elastic member is heat sealed into said top and bottom portions.

6. The invention according to claim 4 wherein said top and bottom portions are each made from a single flat piece of said pliable material.

7. The invention according to claim 6 wherein the seams of said top and bottom portion are held together by heat sealing.

8. The invention according to claim 3 wherein said top portion includes a radius cutout to permit flash cube rotation.

9. The invention according to claim 8 wherein said top portion has a slot for a camera strap.

10. The invention according to claim 9 wherein said top portion has a hole for a tripod.

* * * * *

UNITED STATES PATENT OFFICE
CERTIFICATE OF CORRECTION

Patent No. 3,835,905          Dated Sept. 17, 1974

Inventor(s) Harry Spruyt, & Louis S. Hoffman

It is certified that error appears in the above-identified patent and that said Letters Patent are hereby corrected as shown below:

Column 2, line 45, "27" should be ---37---

Signed and sealed this 31st day of December 1974.

(SEAL)
Attest:

McCOY M. GIBSON JR.
Attesting Officer

C. MARSHALL DANN
Commissioner of Patents